United States Patent
Wu et al.

(10) Patent No.: US 11,778,160 B2
(45) Date of Patent: Oct. 3, 2023

(54) CALIBRATING SENSOR ALIGNMENT WITH APPLIED BENDING MOMENT

(71) Applicant: Microsoft Technology Licensing, LLC, Redmond, WA (US)

(72) Inventors: Yinan Wu, Bellevue, WA (US); Navid Poulad, San Jose, CA (US); Dapeng Liu, Redmond, WA (US); Trevor Grant Boswell, Madera, CA (US); Rayna DeMaster-Smith, Kirkland, WA (US); Roy Joseph Riccomini, Saratoga, CA (US); Michael Edward Samples, Redmond, WA (US); Yuenkeen Cheong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/336,119

(22) Filed: Jun. 1, 2021

(65) Prior Publication Data

US 2022/0385881 A1    Dec. 1, 2022

(51) Int. Cl.
*H04N 13/246*      (2018.01)
*G06F 3/01*        (2006.01)
(Continued)

(52) U.S. Cl.
CPC .......... *H04N 13/246* (2018.05); *G06F 3/013* (2013.01); *H04N 13/239* (2018.05); *H04N 13/366* (2018.05); *H04N 2213/008* (2013.01)

(58) Field of Classification Search
None
See application file for complete search history.

(56) References Cited

U.S. PATENT DOCUMENTS 10,510,137 B1 *    12/2019   Kitain ................... F41G 3/2611
2015/0193980 A1 *   7/2015   Pedley ................. H04N 13/344
                                                        345/419

(Continued)

FOREIGN PATENT DOCUMENTS

WO    2020131277 A1    6/2020
WO    2020132243 A1    6/2020
(Continued)

OTHER PUBLICATIONS

"International Search Report and Written Opinion Issued in PCT Patent Application No. PCT/US22/027965", dated Sep. 1, 2022, 22 Pages.

*Primary Examiner* — Talha M Nawaz
(74) *Attorney, Agent, or Firm* — Alleman Hall Creasman & Tuttle LLP (57) ABSTRACT

Examples are disclosed that relate to calibration data related to a determined alignment of sensors on a wearable display device. One example provides a wearable display device comprising a frame, a first sensor and a second sensor, one or more displays, a logic system, and a storage system. The storage system comprises calibration data related to a determined alignment of the sensors with the frame in a bent configuration and instructions executable by the logic system. The instructions are executable to obtain a first sensor data and a second sensor data respectfully from the first and second sensors, determine a distance from the wearable display device to a feature based at least upon the first and second sensor data using the calibration data, obtain a stereo image to display based upon the distance from the wearable display device to the feature, and output the stereo image via the displays.

17 Claims, 9 Drawing Sheets

(51) Int. Cl.
 *H04N 13/239* (2018.01)
 *H04N 13/366* (2018.01)

(56) References Cited

U.S. PATENT DOCUMENTS

| | | | | |
|---|---|---|---|---|
| 2016/0080732 A1* | 3/2016 | Pedley | ................. | H04N 13/344 |
| | | | | 345/8 |
| 2016/0305926 A1* | 10/2016 | Rachet | ............... | G02B 21/0076 |
| 2017/0131553 A1* | 5/2017 | Pletenetskyy | .......... | G02C 7/081 |
| 2019/0113325 A1* | 4/2019 | Chung | ..................... | G01S 5/00 |
| 2021/0096385 A1* | 4/2021 | Gupta | ................ | G02B 27/0172 |
| 2022/0051441 A1* | 2/2022 | Zahnert | ................ | G02B 27/017 |
| 2022/0060675 A1* | 2/2022 | Ardisana, II | .............. | G06T 7/85 |

FOREIGN PATENT DOCUMENTS

| | | | |
|---|---|---|---|
| WO | 2020263498 A1 | 12/2020 | |
| WO | 2022066989 A1 | 3/2022 | |
| WO | 2022072262 A1 | 4/2022 | |

* cited by examiner

828 — OBTAINING A STEREO IMAGE FOR DISPLAY, THE STEREO IMAGE DETERMINED BASED UPON THE DISTANCE FROM THE WEARABLE DISPLAY DEVICE TO THE FEATURE BASED ON HEAD TRACKING DATA

832 — FURTHER BASED ON EYE TRACKING DATA

834 — FURTHER BASED ON FACE TRACKING DATA

836 — FURTHER BASED ON HAND TRACKING DATA

838 — FURTHER BASED ON IMU DATA

840 — OUTPUT THE STEREO IMAGE TO ONE OR MORE DISPLAYS

CALIBRATING SENSOR ALIGNMENT WITH APPLIED BENDING MOMENT

BACKGROUND

Wearable display devices, such as augmented reality display devices, may render virtual content (e.g. holograms) over a view of a real-world background. By presenting separate left-eye and right-eye images from different perspectives, mixed reality imagery, in which displayed virtual objects appear to interact with physical objects in the real-world background, may be presented.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to calibrating an alignment of sensors on a wearable display device. One example provides a wearable display device comprising a frame, a first sensor and a second sensor spatially distributed on the frame, one or more displays supported by the frame, a logic system, and a storage system. The storage system comprises calibration data related to a determined alignment of the first sensor and the second sensor with the frame in a bent configuration. The storage system further comprises instructions executable by the logic system to obtain first sensor data from the first sensor and obtain second sensor data from the second sensor, determine a distance from the wearable display device to a feature based at least upon the first sensor data and the second sensor data using the calibration data, obtain a stereo image to display based upon the distance from the wearable display device to the feature, and output the stereo image via the one or more displays.

DETAILED DESCRIPTION

Wearable display devices that display virtual holographic content may use sensor data to track a location of the device in an environment. As an example, a head-mounted display device (HMD) may utilize one or more sensors, such as image sensors and/or inertial motion sensors, to track head motion. Direct measurement depth sensors, such as time of flight (ToF) or structured light depth sensors, may be used on some devices for head tracking. However, such direct measurement sensors may be too large to fit onto smaller form-factor wearable devices, such as devices having a form factor of a pair of glasses. Some smaller form-factor HMDs may thus utilize a stereo camera system for head tracking and distance determination. A stereo camera system captures images using two (or more) cameras positioned in a spatially separated arrangement on the device to determine distances to objects in the real-world environment using triangulation.

Head tracking data determined from such sensors, such as distances determined by head tracking stereo cameras, can be used to display stereo images that can appear as holograms. This allows the display of mixed reality images, in which virtual images presented as holograms appear to co-exist and interact with physical real-world objects and environment. However, any errors in determining the distances via sensor data from the sensors can impact a user experience, such as by leading to an inaccurate rendering or display of the hologram. As a result, a hologram may appear to be displayed at an incorrect or unstable location, and/or at an incorrect scale. As examples, an incorrectly located hologram may overlap or float above a real-world object upon which the hologram is meant to appear as being placed, while an unstable hologram may appear to skip around in location as a user moves within the environment. Thus, the inaccurate determination of distance can impact a mixed reality experience.

As a stereo imaging system determines distance values using a plurality of cameras arranged at different spatial locations, errors can arise if the cameras are misaligned relative to one another compared to an expected alignment. To avoid such errors, a stereo camera system may be calibrated during a manufacturing process to calibrate an alignment of the cameras. The determined calibration can be stored on the device and then used in the computation of the distance values from the image data acquired by the cameras.

However, smaller form factor wearable display devices, such as a glasses-like device, may bend when worn, which can impact an alignment of calibrated sensors on the device. For example, a device with a glasses-like form factor may be designed to be somewhat smaller than an intended head size range so that temple pieces of the device exert pressure against the head of the user. However, the pressure against the head may result in a bending moment exerted against a frame of the device, causing the frame to bend. This bending can cause a misalignment of sensors positioned on the frame, leading to errors in distance determinations that can impact hologram display.

Accordingly, examples are disclosed that relate to calibrating an alignment of a first sensor and a second sensor on a wearable display device by performing the calibration with a frame of the device in a bent configuration that is representative of the device is worn by a user having a head width within an intended range of head widths. Information regarding the determined alignment of the first sensor and the second sensor while the frame is in the bent configuration is stored as calibration data. When the wearable display device tracks a location of the device in an environment, the first sensor obtains first sensor data and the second sensor obtains second sensor data. From the first sensor data and the second sensor data, the device determines a distance from the wearable display device to a feature captured using the sensor data and the calibration data, and obtains a stereo image (comprising left and right eye images at different perspectives) for display based upon the distance determined.

Figure 1:
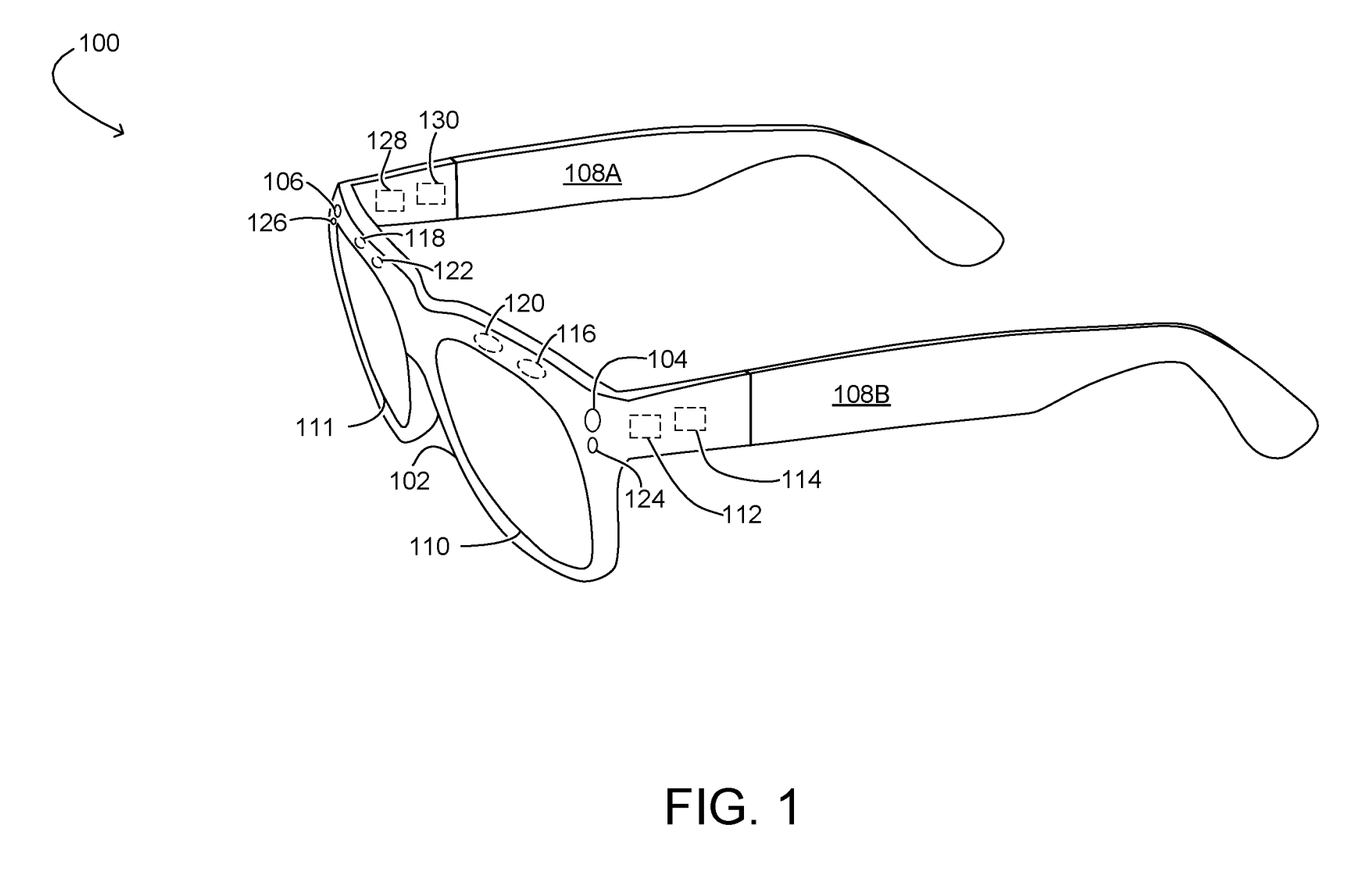
FIG. 1 shows an example wearable display device.

FIG. 1 schematically shows an example wearable display device 100 comprising a frame 102, a first camera 104, a second camera 106, a display, and temple pieces 108. In this example, the display comprises a first display 110 and a second display 111 supported by the frame 102, wherein each of the first display 110 and the second display 111 takes the form of a waveguide configured to deliver a projected image to a respective eye of a user. The first camera 104 and the second camera 106 in this example comprise head tracking cameras located respectively at left and right sides of the frame 102, wherein each of the first camera and the second camera is located on the frame adjacent to an outer edge of the frame. A wearable display device may further comprise other sensors that include aligned left and right components. For example, wearable display device 100 includes an eye tracking system comprising a first eye tracking camera 116 and a second eye tracking camera 118, a face tracking system comprising a first face tracking camera 120 and a second face tracking camera 122, and a hand tracking system comprising a first hand tracking camera 124 and a second hand tracking camera 126. Data from the eye tracking system, the face tracking system, and/or the hand tracking system may be used to detect user inputs, and also may be used to help render the stereo image in various examples.

Wearable display device 100 further comprises a first display module 112 positioned adjacent to the first camera 104 for displaying a first image of the stereo image and a second display module 128 positioned adjacent to the second camera 106 for displaying a second image of the stereo image. Each display module may comprise any suitable display technology, such as a scanned beam projector, a microLED (light emitting diode) panel, a microOLED (organic light emitting diode) panel, or a LCoS (liquid crystal on silicon) panel, as examples. Further, various optics, such as the above-mentioned waveguides, one or more lenses, prisms, and/or other optical elements may be used to deliver displayed images to a user's eyes.

In addition to cameras, a wearable display device further may include other types of sensors sensitive to misalignment due to bending. For example, wearable display device 100 comprises an inertial measurement unit system (IMU) comprising a first IMU 114 positioned adjacent to the first display module 112 and a second IMU 130 positioned adjacent to the second display module 128. First camera 104, first display module 112, and first IMU 114 may be closely mechanically coupled to help prevent changes in alignment from occurring between the first camera 104, the first display module 112, and the first IMU 114. Second camera 106, second display module 128, and second IMU 130 may be similarly closely mechanically coupled. IMU data can be used to adjust a displayed image based upon head motion. IMUs 114 and 130 also can be calibrated with a bending moment applied to the wearable display device 100.

Figure 2:
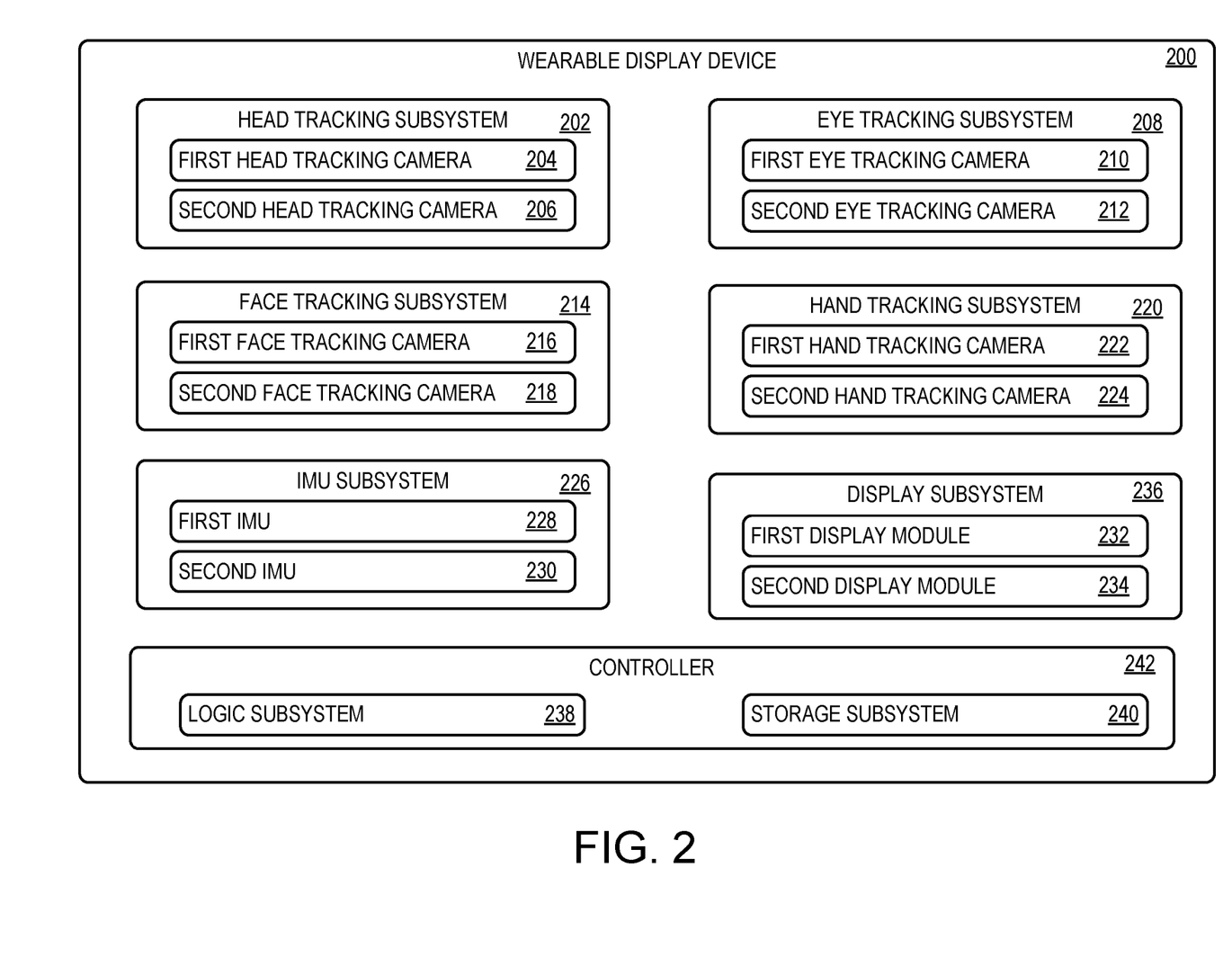
FIG. 2 shows a block diagram of an example wearable display device.

FIG. 2 shows a block diagram of an example wearable display device 200. Wearable display device 100 of FIG. 1 is an example of display device 200 of FIG. 2. Wearable display device 200 comprises a head tracking subsystem 202 comprising a first head tracking camera 204 and a second head tracking camera 206, a display subsystem 236, and a controller 242 comprising a logic subsystem 238 and a storage subsystem 240, examples of which are discussed in more detail in FIG. 9. The display subsystem 236 in the depicted example comprises a first display module 232 and a second display module 234, wherein the first display module is configured to display an image for delivery to a first eye of a user and the second display module is configured to display an image for delivery to a second eye of a user as part of a stereo image. In other examples, a display subsystem may have a single display configured to display images to both eyes.

As mentioned above, a displayed stereo image can be rendered based upon head tracking data captured by the head tracking subsystem 202. The head tracking data can be used to determine a location of the device in an environment and a distance from the device to objects in the environment. This data can then be used to determine left-eye and right-eye images to display that place the hologram in an intended position (e.g. on top of a table or on a wall). An optional inertial measurement unit (IMU) subsystem 226 comprising a first IMU 228 and a second IMU 230 may be used in combination with the head tracking subsystem 202 to help determine the location of the device in the environment, such as by tracking head movement. Other sensor data that may be used to render the stereo image data include eye tracking data from an optional eye tracking system 208 comprising a first eye tracking camera 210 and a second eye tracking camera 212, face tracking data from an optional face tracking subsystem 214 comprising a first face tracking camera 216 and a second face tracking camera 218, and hand tracking data from an optional hand tracking subsystem 220 comprising a first hand tracking camera 222 and a second hand tracking camera 224. Eye tracking data from the eye tracking subsystem 208 may be used to determine a gaze direction, which can be used to place a hologram in an environment and/or for detecting eye gesture inputs for interacting with the hologram. Face tracking data from the face tracking subsystem 214 and hand tracking data from the hand tracking subsystem 220 may be used as face gesture inputs and hand gesture inputs, respectively, to interact with the hologram. Misalignment of any of the eye tracking cameras, the face tracking cameras, or the hand tracking cameras may result in inaccurate hologram placement and/or inaccurate or mistaken input gestures.

Figure 3:
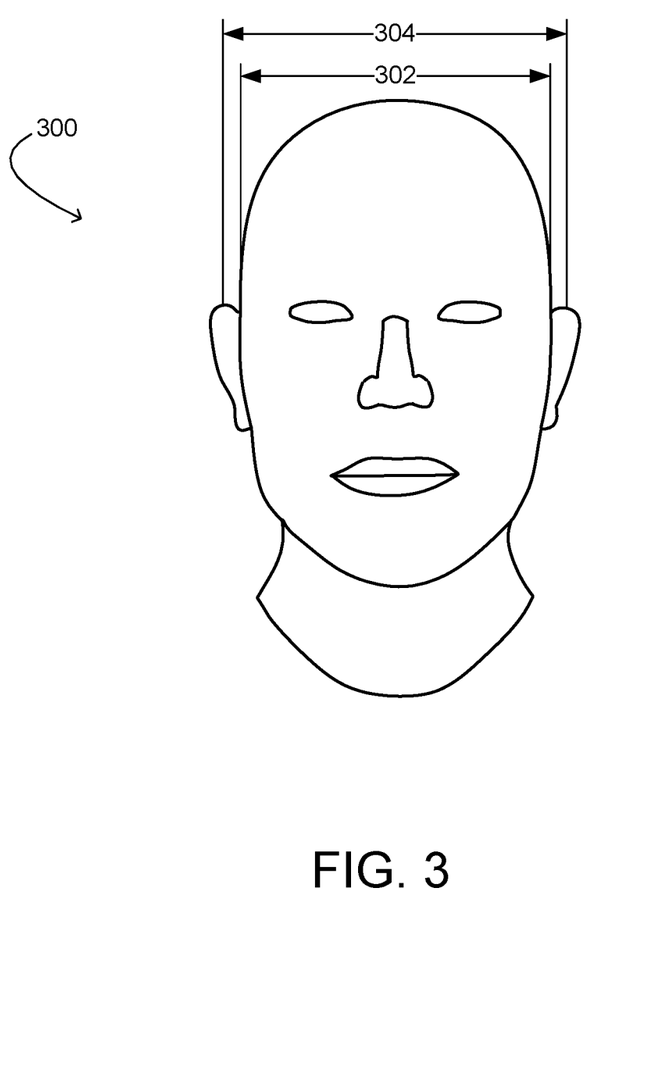
FIG. 3 illustrates an example range of human head widths.

As mentioned above, a wearable display device with a glasses form factor may be designed to be somewhat smaller than an intended head size range so that temple pieces of the device exert pressure against the head of the user, causing the frame to bend. The bending may be different for different users, as a wearable display device may be used by a population of users with a distribution of different head widths. FIG. 3 illustrates a human head, 300, and qualitatively shows a range of head widths extending between a minimum head width 302 to a maximum head width 304 of an intended range of head widths for a wearable device. To help ensure that a wearable display device securely fits even the smallest head widths in the intended range of head widths, the wearable display device may be designed such that the temple pieces exert pressure against heads of a smallest size within the intended range. As such, a frame of the device may bend somewhat for users with the smallest head widths in the intended range, and more for users with larger head widths.

Figure 4A:
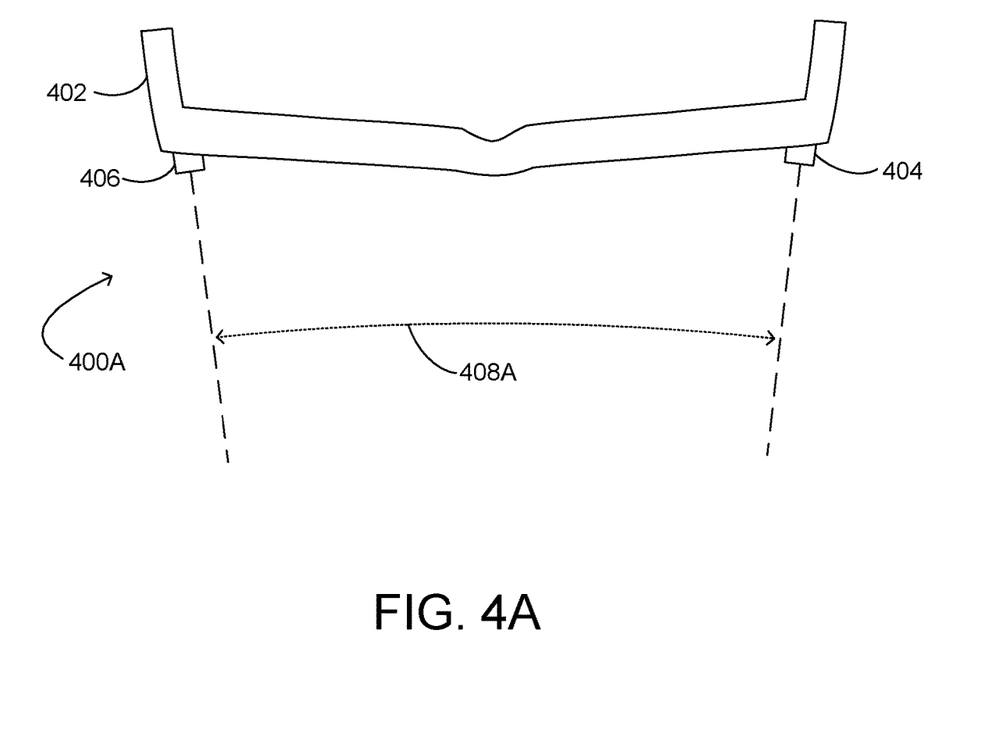
FIG. 4A shows an example wearable display device frame in an unbent configuration.
Figure 4B:
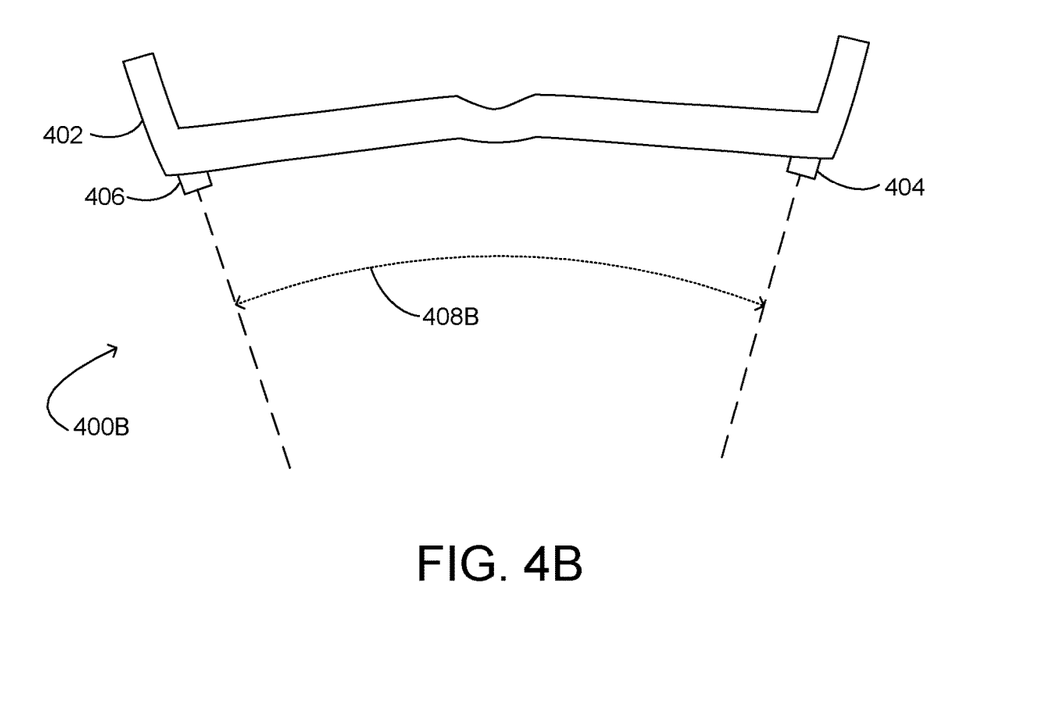
FIG. 4B shows the example wearable display device frame in a bent configuration illustrative of the device state when worn.

FIG. 4A shows at 400A an example wearable display device frame 402 in an unbent configuration with no applied bending moment, such as in the as-built state of the wearable display device. In contrast, FIG. 4B shows, at 400B, the frame 402 in a bent configuration such as under a bending moment illustrative of the device being worn by a user. An alignment between a first camera 404 and a second camera 406 of a head tracking system is represented by arc 408A. Bending of the frame 402 that occurs when the wearable display device is worn by the user changes an alignment of the first and second cameras, as indicated by the greater curvature of arc 408B compared to arc 408A. Where the alignment of the first camera 404 and the second camera 406 is calibrated in the device state shown at 400A, the bend shown at arc 408B can induce pointing errors, wherein the term "pointing error" indicates an error in the alignment of a sensor (e.g. a camera, IMU, and/or other calibrated sensor) compared to a calibrated alignment. A pointing error above a threshold value may visibly impact a displayed hologram.

Figure 5:
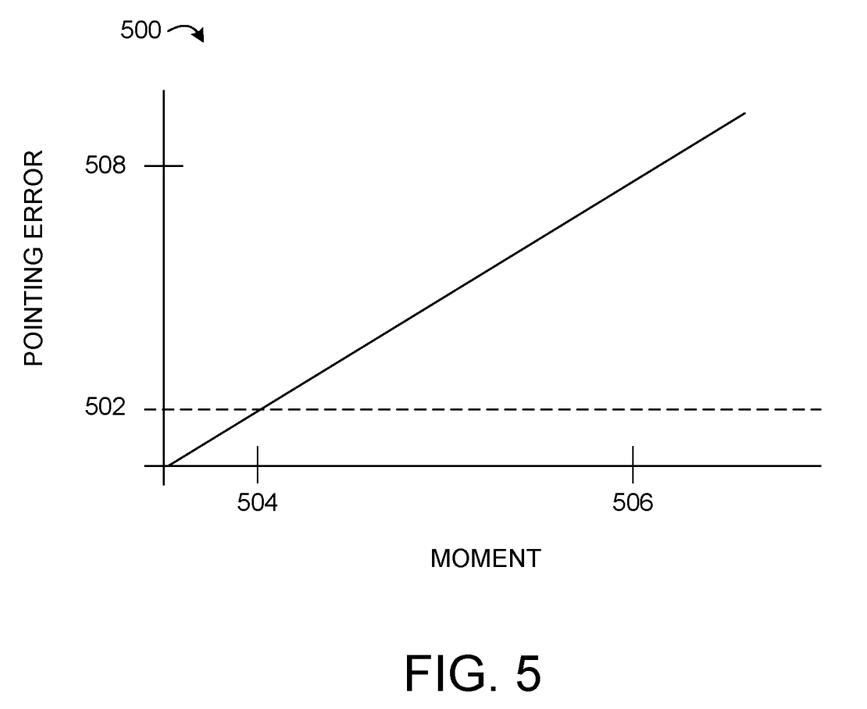
FIG. 5 shows a graph representing an example of pointing error as a function of bending moment for an example wearable display device.

FIG. 5 shows a graph 500 that qualitatively illustrates an example linear relationship between pointing error and bending moment applied to an example wearable display device. A pointing error over a threshold value 502 may impact a user experience, as displayed holograms may appear misplaced. However, a bending moment that gives rise to a pointing error over the threshold may be met by a substantial portion of a range of intended head sizes where the camera alignment is calibrated in an unbent configuration such as with no bending moment applied.

Figure 6:
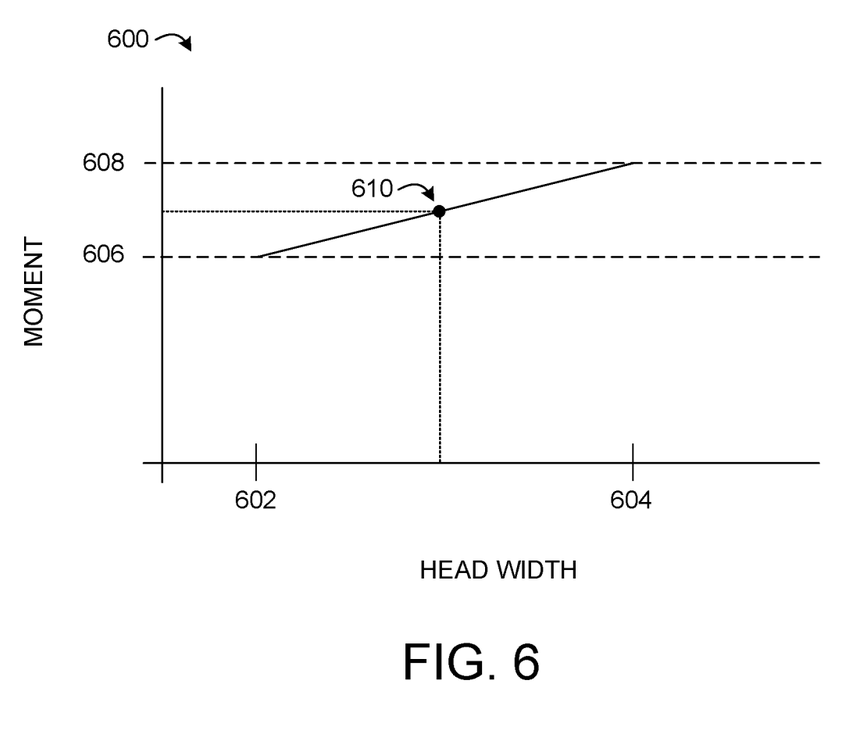
FIG. 6 shows a graph representing an example of bending moment as a function of user head width for an example wearable display device.

FIG. 6 shows a graph 600 qualitatively representing an example linear relationship between bending moment and user head width for a wearable display device such as those described herein. As mentioned above, a wearable display device may be designed to accommodate a selected range of head widths. An example of such a range is shown by locations 602 and 604 in FIG. 6. The vertical axis illustrates a range of bending moments that corresponds to this range of head sizes. Head width 602 represents a minimum head width within the intended range of head widths, and 604 indicates a maximum head width. The bending moment shown at 606 corresponds to a determined moment that provides a suitably secure fit on a head of the minimum width in the range of intended head widths, and bending moment 608 represents a bending moment corresponding to a maximum head width within the range of intended head widths. Thus, sensor alignment on the wearable display device can be calibrated in a bent configuration corresponding to a bending moment resulting from a head width within the intended range is applied. An example of such a bending moment is shown at midpoint 610. Calibrating sensor alignment midway between the minimum and maximum intended head widths may accommodate both the minimum and maximum head widths with acceptable pointing error. In other examples, a bent configuration corresponding to a head width other than a midpoint width can be used for calibration, such as a minimum head width, a median head with, or other head width based on a statistical user population study.

Figure 7:
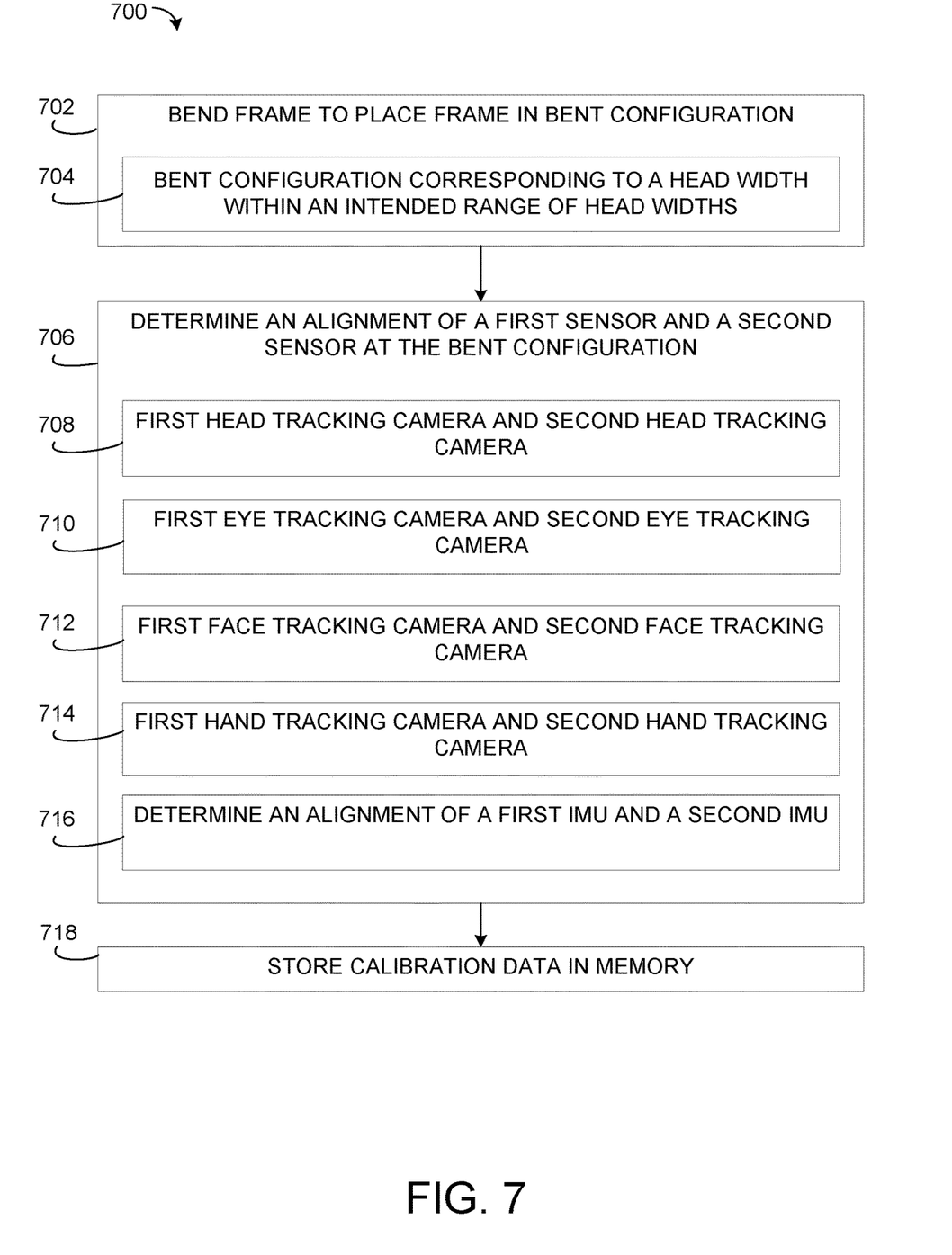
FIG. 7 shows a flow diagram of an example method for calibrating a wearable display device with an applied bending moment.

FIG. 7 illustrates a flow diagram depicting example method 700 for calibrating an alignment of a first sensor and a second sensor of a wearable display device. Method 700 may be performed on wearable display devices shown in FIG. 1, FIG. 2, FIG. 4, and/or any other suitable wearable display device. Method 700 comprises, at 702, applying a bending a frame of a wearable display device to place the frame in a bent configuration. The bent configuration may be selected based upon a range of intended head widths, and application of the bent configuration causes the bending of a frame of the device, thereby changing an alignment of sensors on the frame compared to an unbent device state. In some examples, the bent configuration may correspond to a head width within an intended range of head widths, as indicated at 704.

Continuing, method 700 further comprises, at 706, determining an alignment of a first sensor and a second sensor at the bent configuration. The alignment determined may comprise one or more of an alignment of a first head tracking camera and a second head tracking camera at 708, an alignment of a first eye tracking camera and a second eye tracking camera at 710, an alignment of a first facing tracking camera and a second face tracking camera at 712, an alignment of a first hand tracking camera and a second hand tracking camera at 714, and an alignment of a first IMU and a second IMU at 716. Further, alignments between sensors of different types also may be determined, such as an alignment between a camera and an IMU. Method 700 further comprises, at 718, storing calibration data related to the alignment of the first and second sensors in memory on the wearable display device. The calibration data may comprise one or more datum related to the alignment of any suitable sensors.

Figure 8A:
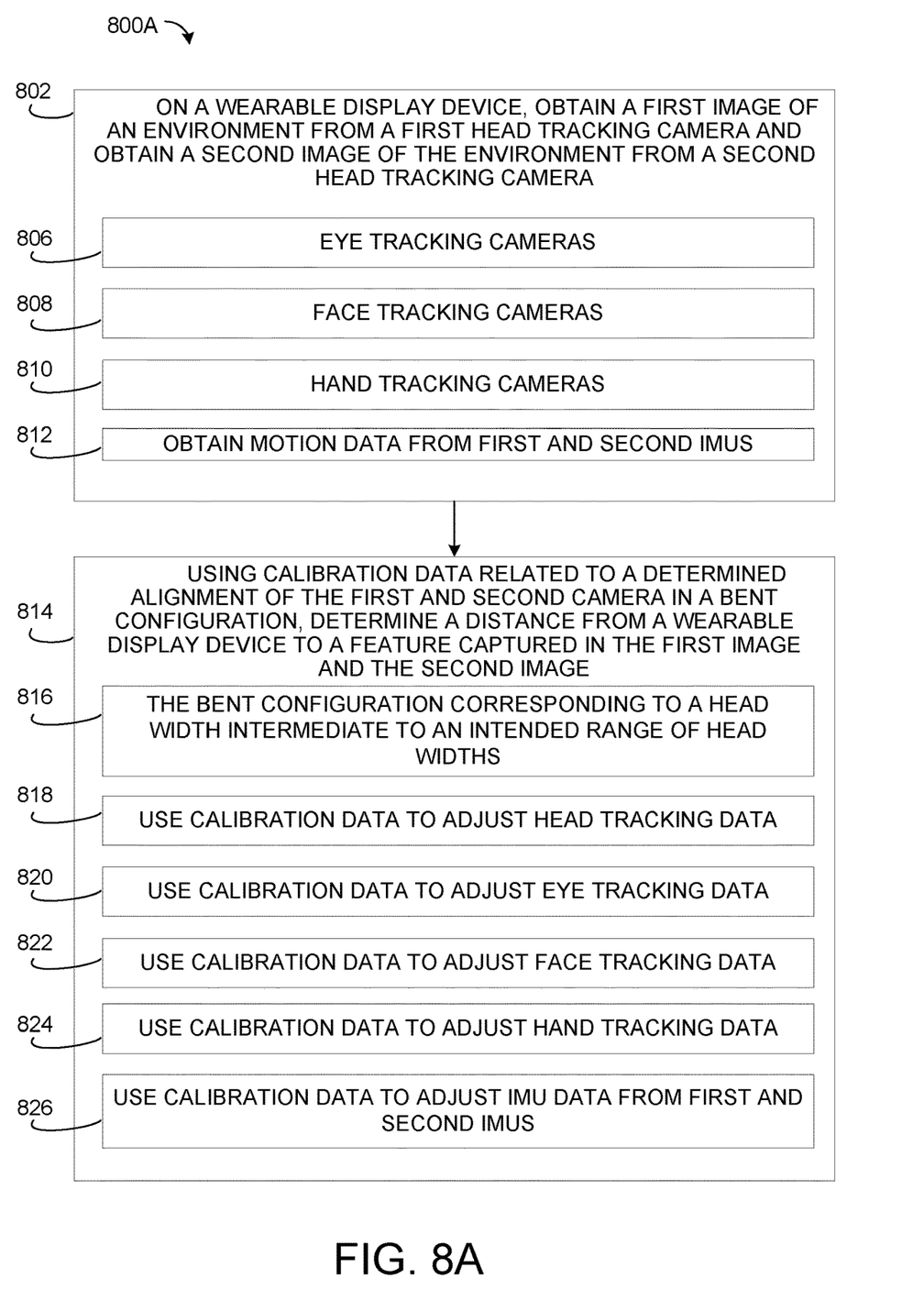
FIG. 8A and FIG. 8B show a flow diagram of an example method for displaying a hologram using calibration data related to a sensor alignment determined with an applied bending moment.

FIG. 8 shows a flow diagram depicting example method 800 for using calibration data to output a stereo image for display via a wearable display device. Method 800 may be performed on any suitable wearable display device, such as those shown in FIG. 1, FIG. 2, and/or FIG. 4 and described herein. Method 800 comprises, at 802, obtaining a first image from a first head tracking camera and obtaining a second image from a second head tracking camera. The device further may comprise eye tracking cameras 806, face tracking cameras 808, and face tracking cameras 810. Method 800 may further comprise, at 812, obtaining motion data from a first IMU and a second IMU.

At 814, method 800 further comprises using calibration data related to a determined alignment of the first and second cameras in a bent configuration to determining a distance from the wearable display device to a feature captured in the first and second images. The calibration data comprises calibrations of an alignment of the cameras when the device is in the bent configuration, and the bent configuration may correspond to a bent configuration that would result from the device being worn on a head. In some examples, at 816, the bent configuration corresponds to a head width within an intended range of head widths. In other examples, the bent configuration may correspond to a minimum head width in the intended range of head widths.

Method 800 further comprises adjusting image data from the head tracking cameras using the calibration data, as indicated at 818. Further, method 800 further may comprise one or more of using the calibration data to adjust eye tracking data at 820, using calibration data to adjust facing tracking data at 822, using calibration data to adjust hand tracking data at 824, or using calibration data to adjust IMU data from the first and second IMUs at 826. Any other suitable data from sensors on the wearable display device also may be adjusted using the calibration data. Using the calibration data acquired with a bent configuration applied to a frame to adjust the head tracking data may reduce a pointing error compared to adjusting the head tracking data using calibration data acquired without a bent configuration applied to the frame.

Figure 8B:
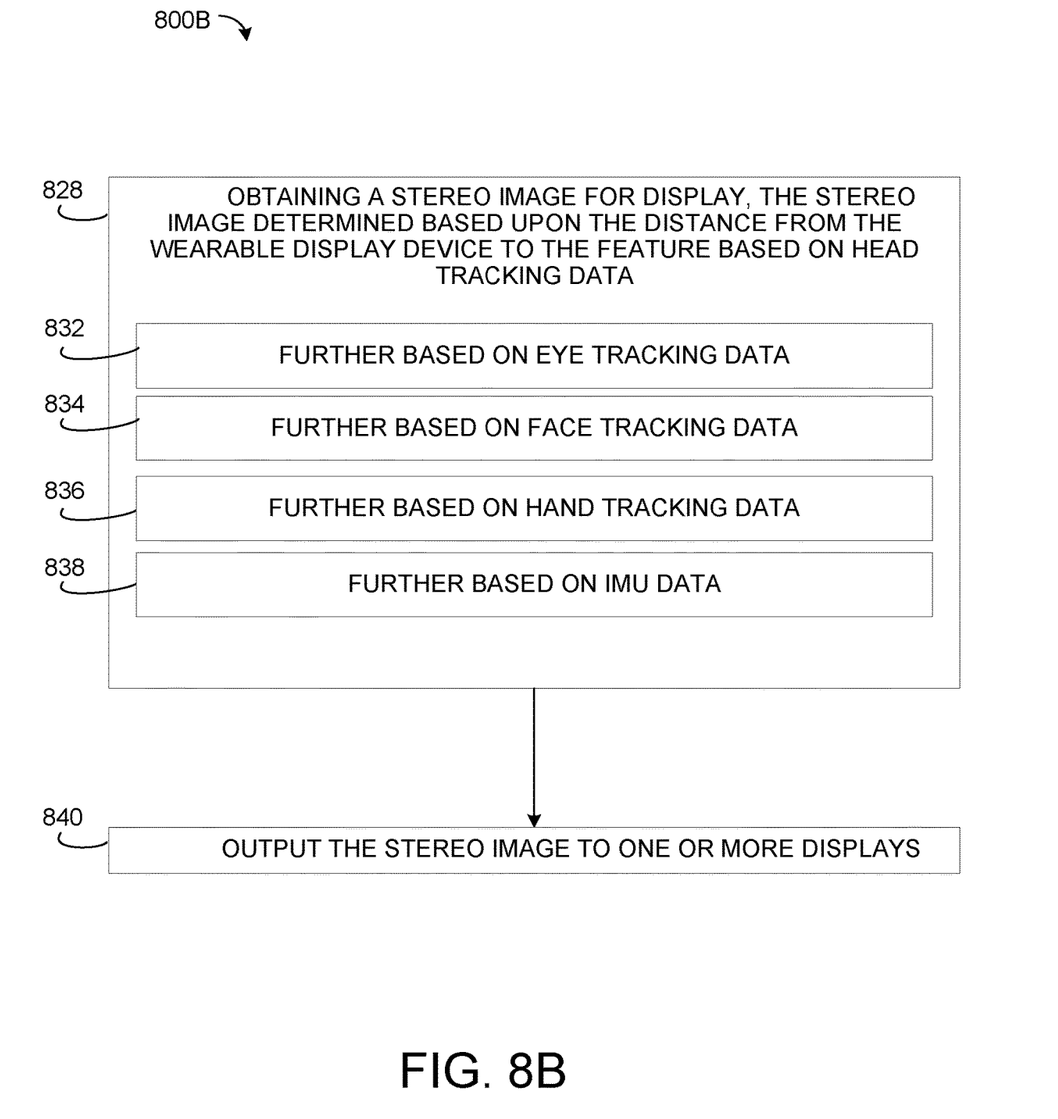

At 828, method 800 further comprises obtaining a stereo image for display, the stereo image determined based upon the distance from the wearable display device to the feature imaged based on the head tracking data. The stereo image may be rendered locally on the wearable display device, or rendered by and obtained from a remote service based upon data provided by the display device to the remote service (e.g. where the virtual content corresponds to an online game, game content may be rendered remotely by a remote game service and sent to the wearable display device based upon head tracking data and/or other suitable data provided to the remote game service). Additionally or alternatively, the stereo image displayed may be further based on one or more of eye tracking data at 832, face tracking data at 834, hand tracking data at 836, and IMU data at 838. At 840, method 800 further comprises outputting the stereo image to one or more displays on the wearable display device.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
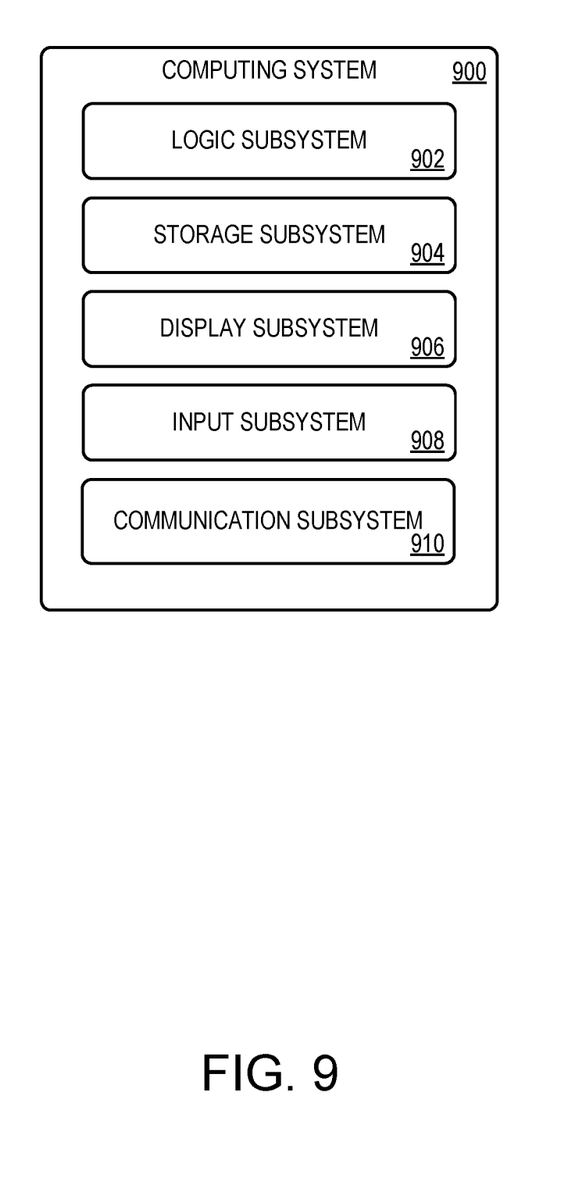
FIG. 9 shows a block diagram of an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic subsystem 902 and a storage subsystem 904. Computing system 900 may optionally include a display subsystem 906, input subsystem 908, communication subsystem 910, and/or other components not shown in FIG. 9.

Logic subsystem 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 904 includes one or more physical devices configured to hold instructions executable by the logic machine to implement the methods and processes described herein. When such methods and processes are implemented, the state of storage subsystem 904 may be transformed—e.g., to hold different data.

Storage subsystem 904 may include removable and/or built-in devices. Storage subsystem 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 904 may include volatile, nonvolatile, dynamic, static, read/write, read-only, random-access, sequential-access, location-addressable, file-addressable, and/or content-addressable devices.

It will be appreciated that storage subsystem 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 902 and storage subsystem 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

It will be appreciated that a "service", as used herein, is an application program executable across multiple user sessions. A service may be available to one or more system components, programs, and/or other services. In some implementations, a service may run on one or more server-computing devices.

When included, display subsystem 906 may be used to present a visual representation of data held by storage subsystem 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic subsystem 902 and/or storage subsystem 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

Another example provides a wearable display device comprising a frame, a first sensor and a second sensor spatially distributed on the frame, one or more displays supported by the frame, a logic system, a storage system comprising calibration data related to a determined alignment of the first sensor and the second sensor with the frame in a bent configuration, and instructions executable by the logic system. The instructions executable to obtain a first sensor data from the first camera, and obtain a second sensor data from the second camera, using the calibration data, determine a distance from the wearable display device to a feature based at least upon the first sensor data and the second sensor data, obtain a stereo image to display based upon the distance from the wearable display device to the feature, output the stereo image via the one or more displays. Alternately or additionally each of the first sensor and the second sensor are located on the frame adjacent to an outer edge of the frame. Alternatively or additionally, the first sensor and the second sensor comprise head tracking cameras. The device alternatively or additionally comprising a first display module positioned adjacent to the first camera for displaying a first image of the stereo image, and a second display module positioned adjacent to the second camera for displaying a second image of the stereo image. The device alternatively or additionally comprising one or more of an inertial measurement unit (IMU) system comprising a first IMU positioned adjacent to the first display module and a second IMU positioned adjacent to the second display module, an eye tracking system comprising a first eye tracking camera and a second eye tracking camera, a face tracking system comprising a first face tracking camera and a second face tracking camera, or a hand tracking system comprising a first hand tracking camera and a second hand tracking camera, and wherein the instructions are executable to adjust data from the one or more of the IMU system, the eye tracking system, the face tracking system, or the hand tracking system using the calibration data. Alternatively or additionally, the bent configuration is based on an intended range of head widths.

Another example provides on a wearable display device comprising a frame, a first sensor and a second sensor spatially distributed on the frame, and one or more displays supported by the frame, a method of calibrating an alignment of the first sensor and the second sensor. The method comprising applying a bent configuration to the frame, determining a determined alignment of the first sensor and the second sensor in the bent configuration, storing calibration data in memory on the wearable display device based upon the determined alignment. Applying the bent configuration alternatively or additionally comprises applying a bent configuration selected within an intended range of head widths. Alternatively or additionally, the first sensor and the second sensor respectively comprise a first head tracking camera and a second head tracking camera. Alternatively or additionally, the first sensor and the second sensor respectively comprise a first eye tracking camera and a second eye tracking camera. Alternatively or additionally, the first sensor and the second sensor respectively comprise a first face tracking camera and a second face tracking camera. Alternatively or additionally, the first sensor and the second sensor respectively comprise a first hand tracking camera and a second hand tracking camera. Alternatively or additionally, the first sensor and the second sensor respectively comprise a first inertial measurement unit (IMU) and a second IMU.

Another example provides on a wearable display device comprising a frame, a first camera and a second camera spatially distributed on the frame, one or more displays supported by the frame, and a storage system comprising calibration data related to a determined alignment of the first camera and the second camera with the frame in a bent configuration, a method comprising obtaining a first image of an environment from the first camera and obtaining a second image of the environment from the second camera, using the calibration data, determining a distance from the wearable display device to a feature captured in the first image and the second image, obtaining a stereo image to display based upon the distance from the wearable display device to the feature, outputting the stereo image via the one or more displays. Alternatively or additionally, the first camera and the second camera comprise head tracking cameras. Alternatingly or additionally, the wearable display device further comprises an eye tracking system comprising a first eye tracking camera and a second eye tracking camera, and the method further comprising adjusting eye tracking data determined by the eye tracking system based upon the calibration data. Alternatively or additionally, the wearable display device further comprises a face tracking system comprising a first face tracking camera and a second face tracking camera, and the method further comprising adjusting face tracking data determined by the face tracking system based upon the calibration data. Alternatively or additionally, the wearable display device further comprises a hand tracking system comprising a first hand tracking camera and a second hand tracking camera, and the method further comprising adjusting hand tracking data determined by the hand tracking system based upon the calibration data. Alternatively or additionally, the wearable display device further comprises a first inertial measurement unit (IMU) and a second IMU, and the method further comprising adjusting IMU data determined by the first and second IMU based upon the calibration data. Alternately or additionally the bent configuration is based within an intended range of head widths.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A wearable display device comprising:
a frame;
a first sensor and a second sensor spatially distributed on the frame;
one or more displays supported by the frame;
a logic system; and
a storage system comprising
calibration data related to a determined alignment between the first sensor and the second sensor with the frame in a bent configuration the calibration data comprising data determined during manufacturing of the wearable display device and the bent configuration corresponding to a bending moment that would result from the device being worn on a head within an intended range of head widths, and instructions executable by the logic system to
obtain first sensor data from the first sensor, and obtain second sensor data from the second sensor,
using the calibration data, determine a distance from the wearable display device to a feature based at least upon the first sensor data and the second sensor data;
obtain a stereo image to display based upon the distance from the wearable display device to the feature; and
output the stereo image via the one or more displays.

2. The device of claim 1, wherein the first sensor comprises a camera and the second sensor comprises an inertial measurement unit (IMU).

3. The device of claim 1, wherein the first sensor and the second sensor comprise head tracking cameras.

4. The device of claim 3, further comprising a first display module positioned adjacent to the first camera for displaying a first image of the stereo image, and a second display module positioned adjacent to the second camera for displaying a second image of the stereo image.

5. The device of claim 4, further comprising one or more of an inertial measurement unit (IMU) system comprising a first IMU positioned adjacent to the first display module and a second IMU positioned adjacent to the second display module, an eye tracking system comprising a first eye tracking camera and a second eye tracking camera, a face tracking system comprising a first face tracking camera and a second face tracking camera, or a hand tracking system comprising a first hand tracking camera and a second hand tracking camera, and
wherein the instructions are executable to adjust data from the one or more of the IMU system, the eye tracking system, the face tracking system, or the hand tracking system using the calibration data.

6. On a wearable display device comprising a frame, a first sensor and a second sensor spatially distributed on the frame, and one or more displays supported by the frame, a method of calibrating an alignment between the first sensor and the second sensor, the method comprising:
during device manufacturing, bending the frame to place the frame in a bent configuration to the frame, the bent configuration corresponding to a bending moment that would result from the device being worn on a head within an intended range of head widths;
while the frame is in the bent configuration, determining a determined alignment between the first sensor and the second sensor in the bent configuration; and
storing calibration data in memory on the wearable display device based upon the determined alignment.

7. The method of claim 6, wherein the first sensor and the second sensor respectively comprise a first head tracking camera and a second head tracking camera.

8. The method of claim 6, wherein the first sensor and the second sensor respectively comprise a first eye tracking camera and a second eye tracking camera.

9. The method of claim 6, wherein the first sensor and the second sensor respectively comprise a first face tracking camera and a second face tracking camera.

10. The method of claim 6, wherein the first sensor and the second sensor respectively comprise a first hand tracking camera and a second hand tracking camera.

11. The method of claim 6, wherein the first sensor and the second sensor respectively comprise a first inertial measurement unit (IMU) and a second IMU.

12. On a wearable display device comprising a frame, a first camera and a second camera spatially distributed on the frame, one or more displays supported by the frame, and a storage system comprising calibration data related to a determined alignment between the first camera and the second camera with the frame in a bent configuration, a method comprising:
obtaining a first image of an environment from the first camera and obtaining a second image of the environment from the second camera;
using the calibration data, determining a distance from the wearable display device to a feature captured in the first image and the second image, wherein using the calibration data comprises using calibration data that was determined during manufacturing of the wearable display device and for which the bent configuration corresponds to a bending moment that would result from the device being worn on a head within an intended range of head widths;
obtaining a stereo image to display based upon the distance from the wearable display device to the feature; and
outputting the stereo image via the one or more displays.

13. The method of claim 12, where the first camera and the second camera comprise head tracking cameras.

14. The method of claim 13, wherein the wearable display device further comprises an eye tracking system comprising a first eye tracking camera and a second eye tracking camera, and
the method further comprising adjusting eye tracking data determined by the eye tracking system based upon the calibration data.

15. The method of claim 13, wherein the wearable display device further comprises a face tracking system comprising a first face tracking camera and a second face tracking camera, and
the method further comprising adjusting face tracking data determined by the face tracking system based upon the calibration data.

16. The method of claim 13, wherein the wearable display device further comprises a hand tracking system comprising a first hand tracking camera and a second hand tracking camera, and
the method further comprising adjusting hand tracking data determined by the hand tracking system based upon the calibration data.

17. The method of claim 12, wherein the wearable display device further comprises a first inertial measurement unit (IMU) and a second IMU, and
the method further comprising adjusting IMU data determined by the first and second IMU based upon the calibration data.

* * * * *